United States Patent [19]
Bernard et al.

[11] 3,887,696

[45] June 3, 1975

[54] PROCESS AND APPARATUS FOR HETEROGENEOUS CATALYSIS OF A CHEMICAL REACTION, PARTICULARLY CATALYTIC DECOMPOSITION OF HYDROGEN PEROXIDE

[75] Inventors: Michel Louis Bernard, Poitiers; Gerard Coudrin, Nantes, both of France

[73] Assignee: Republic of France, Paris, France

[22] Filed: Dec. 26, 1972

[21] Appl. No.: 318,655

[30] Foreign Application Priority Data
Dec. 23, 1971  France .............................. 71.46266

[52] U.S. Cl. .................................. 423/579; 204/129
[51] Int. Cl. ............................................ C01b 13/02
[58] Field of Search ...................... 204/129; 423/579

[56] References Cited
UNITED STATES PATENTS
3,520,137   7/1970   Newman et al. ..................... 204/129

*Primary Examiner*—R. L. Andrews
*Attorney, Agent, or Firm*—Larson, Taylor & Hinds

[57] ABSTRACT

The invention relates to a process of heterogeneous catalysis of a chemical reaction in the liquid phase, applied especially to the catalytic decomposition of aqueous solutions of hydrogen peroxide. The process of the invention is characterized in that the catalyst that is used is subjected to a voltage which has the effect of electrochemically polarizing it. The process is applied to development of an oxygen generator with controllable output which comprises: a direct current generator, a catalysis chamber in which there is effected the catalytic decomposition of a solution of hydrogen peroxide, producing a release of oxygen, comprising at least two electrodes one of which is constituted by a catalyst of the said decomposition, a buffer chamber that collects the released oxygen, associated with a pressure sensor, and a voltage control device for the said electrodes, controlled by the said pressure sensor.

9 Claims, 4 Drawing Figures

PL. I-3

FIG: 3
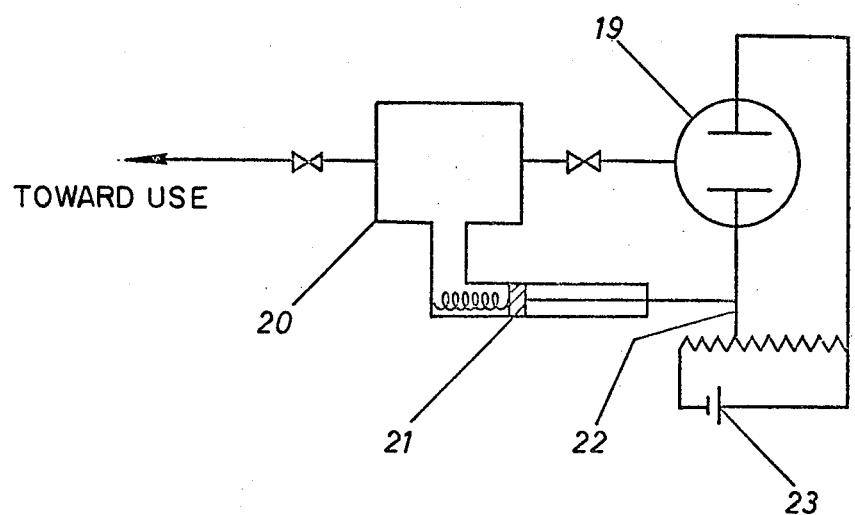
FIG: 4
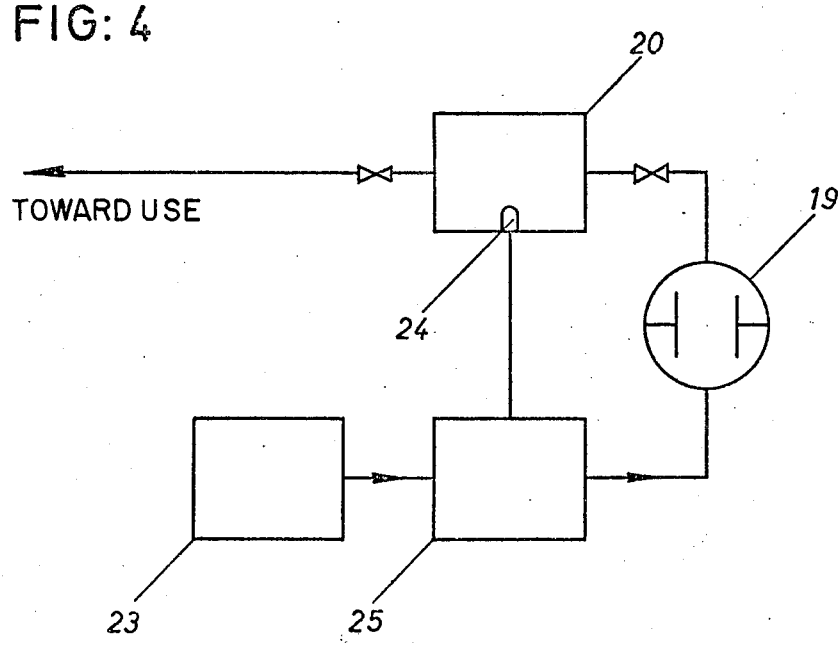

3,887,696

PROCESS AND APPARATUS FOR HETEROGENEOUS CATALYSIS OF A CHEMICAL REACTION, PARTICULARLY CATALYTIC DECOMPOSITION OF HYDROGEN PEROXIDE

FIELD OF THE INVENTION

The present invention relates to a process of heterogeneous catalysis of a chemical reaction, especially a process of catalytic decomposition of hydrogen peroxide.

BACKGROUND AND SUMMARY

It is known that hydrogen peroxide is used in industry for its oxidizing properties, e.g. in the dye industry and in bleaching, often in a more or less dilute solution, and in pH ranges that vary and that may often be high (bleaching).

Similarly, the oxidation-reduction properties of hydrogen peroxide are utilized in combustion or autodecomposition reactions. In reaction engine technique, particularly rocket engines, hydrogen peroxide can be used as a monergol [fuel] in concentrated state (preferably 85 to 99%) to get a combustion temperature and consequently a specific thrust that is as high as possible from the high caloric energy liberated by its decomposition: 23.44 kilocal/mole.

This same decomposition may also be desired for its capability of generating oxygen that can be used for example in renewing atmospheres suitable for breathing (aviation, space, sea, mines, etc.) in competition with use of other systems such as superoxides or chlorate candles. Besides, the formation of water and the simultaneous release of heat can justify interest in space applications of hydrogen peroxide. In any case, in these systems the use of catalytically decomposed hydrogen peroxide runs into the difficulty of controlling the oxygen generating reaction.

Decomposition of hydrogen peroxide into $H_2O$ and $O_2$ can be effected by catalytic activation. Various "catalysts" have been suggested for the decomposition of hydrogen peroxide, especially for applications in rocket engines. Among them there may be mentioned the permanganates, used to actuate Walter turbines which drive the propellant feed pumps, as used in V2 rockets by the Germans in World War II. More recently, true catalysts such as silver have been used. Different versions of this formula have been used. For example, Charles E. Saunders (U.S. Pat. No. 3,019,197) describes a catalyst comprising electrodeposited porous silver on a support, the porous silver being in turn covered with a coating of silver oxide. John W. Putt and Thomas K. Rice (U.S. Pat. No. 3,212,255) describe a catalyst made by a double deposition of silver and nickel on a silver-rich support.

With the idea of increasing the reactivity of the hydrogen peroxide in contact with catalysts such as silver, especially to increase the catalytic activity at low temperature, the introduction of various substances into the hydrogen peroxide has also been suggested. Thus Herman J. Baumgartner and Georges C. Hood (U.S. Pat. Nos. 3,333,419 and 3,347,630) describe a process that consists in introducing into the hydrogen peroxide a small amount of a mineral salt of a metal with fixed valency, taken from the metals starting on the second column of the periodic table of elements (Z=30), especially zinc, cadmium and rare earth elements.

Herman J. Baumgartner and Richard N. Roberts (U.S. Pat. No. 3,156,089) propose introduction of small amounts of organic residues from preparation of hydrogen peroxide by oxidation of a secondary alcohol as described in U.S. Pat. No. 2,871,104. Finally, Richard M. Roberts and Geza S. Ronay propose introduction into the hydrogen peroxide of small amounts of soluble polar compounds containing a halogenated hydrocarbon chain of specific characteristics.

The efficiency of these various additives is relatively low.

In sum, the drawbacks of present techniques of decomposition of hydrogen peroxide by silver in heterogeneous catalysis (especially in its use as a gas generator or rocket engine) are the following:

regulation of the decomposition can only be done by regulation of the amount of hydrogen peroxide allowed to flow to the catalyst;

when the hydrogen peroxide is put in contact with the catalyst, no known process allows control of the reaction in situ, with stopping of it in urgent situations;

the catalyst dissolves slowly in hydrogen peroxide, it "wears out".

Parallel to this, there is a lowering of catalytic activity (or of the rate of decomposition of the hydrogen peroxide).

The present invention is intended to remedy the above mentioned drawbacks.

The invention thus is addressed to a process of heterogeneous catalysis of a chemical reaction in liquid phase, applied especially to the catalytic decomposition of aqueous solutions of hydrogen peroxide, the catalyst used being metallic and belonging to the class constituted by the transition elements of groups I, VI, VII and VIII, which process is characterized in that the said catalyst is subjected to a voltage that has the effect of polarizing it electrochemically.

Preferably, the catalysts used can be metallic silver or a silver compound, platinum, a platinum compound, or a platinum metal, a triad element or a compound thereof.

More precisely, the invention relates to a process as described above, characterized in that there is added to the solution of hydrogen peroxide a salt or a compound which ensures a high electroconductivity of the said solution.

There may also be added to the hydrogen peroxide solution a salt or a compound that fixes the pH of the said solution.

Another object of the invention is a process as described above, characterized further in that there is added to the said solution a compound that is an inhibitor of the decomposition of hydrogen peroxide. This inhibitor compound preferably is a phosphate.

According to another object of the invention, the voltage applied to the catalyst may be a cathode voltage or alternating voltage, applied continuously or intermittently.

The invention further concerns a process as described above, characterized in that preliminarily there is effected cathodic polarization of the catalyst, before the catalytic decomposition.

Finally, the application discloses to a device for application of the above process, constituted by an oxygen generator with adjustable output, comprising: a direct current generator, a catalytic chamber in which the catalytic decomposition of a solution of hydrogen peroxide is effected, producing a release of oxygen, the said chamber comprising at least two electrodes energized by the said generator, at least one of the said electrodes being constituted by a catalyst of the said reaction of decomposition, a buffer chamber that collects the released oxygen, associated with a manometer or a pressure sensor, and a control device for the voltage of the said electrodes, controlled by the said manometer or the said pressure sensor.

DESCRIPTION OF THE DRAWINGS

The invention is described in more detail below, as a non limitative example, with reference to the attached drawings, in which:

FIGS. 3 and 4 are schematics of two embodiments of an oxygen generator with controllable output for carrying out the invention.

DESCRIPTION OF THE PREFERRED EMBODIMENTS

Figure 1:
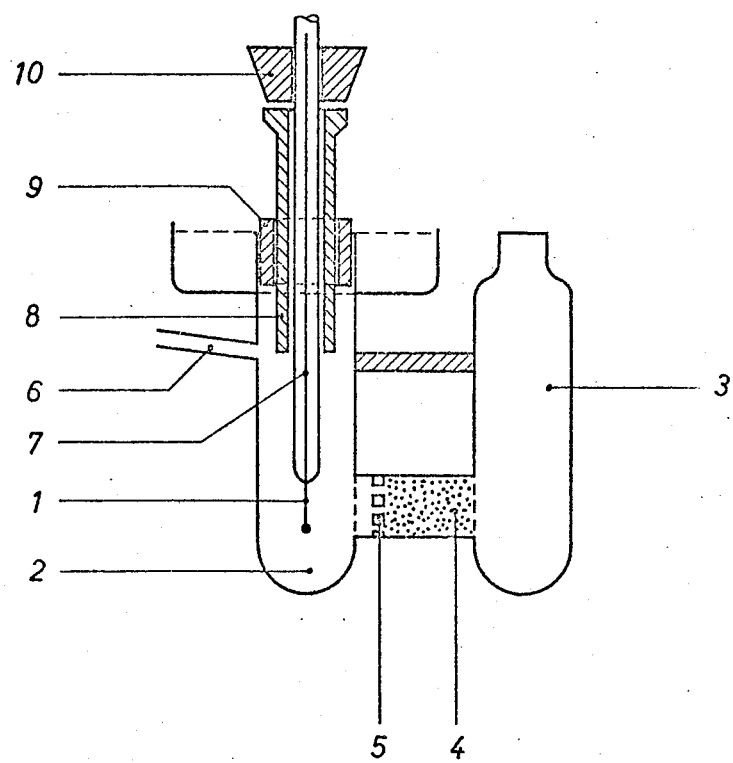
FIGS. 1 and 2 show schematically in section two devices used for determination of the experimental results.

The increase of catalytic activity, for example of silver, can be shown from the following report of experiment, of which FIG. 1 is a schematic representation.

A silver wire 1 dips into cathodic compartment 2 of an electrochemical cell with two separate compartments containing a 15% by weight solution of hydrogen peroxide with addition of potassium nitrate (molar solution).

The second compartment 3, separated from the first by a salinated junction that comprises an agar-agar bridge 4 and a disk of fritted glass 5, contains a comparison electrode Ag/AgNO$_3$, 0.5 M, which is not shown in the drawing. The gaseous release issuing from the cathode compartment via evacuation tube 6 is measured, and from this measurement there is deduced the rate of decomposition without polarization and for different values of the voltage applied between the two electrodes. The cathode compartment, including a copper wire 7 fixed in a sleeve of roughened glass 8, is closed by stoppers 9 and 10. The results are the following:

Table 1

| Applied voltage | specific decomposition rate | increase % |
|---|---|---|
| 0 | 0.145 cm$^3$/s cm$^2$ | |
| −0.1 volt | 0.20 cm$^3$/s cm$^2$ | 38% |
| −0.4 volt | 0.39 cm$^3$/s cm$^2$ | 170% |
| −0.5 volt | 0.42 cm$^3$/s cm$^2$ | 190% |
| −1 volt | 0.42 cm$^3$/s cm$^2$ | 190% |

The increase in the rate of decomposition is a growing function of the difference of applied potential. Besides, this phenomenon is accompanied by passage of a current in the electrolysis circuit of the order of $10^{-4}$ to $10^{-3}$ A, which is a function of the applied voltage, and by a substantial rise in the pH of the cathode compartment. These pH variations can be demonstrated by separation of the electrodes.

In practice, the use of a counter electrode which is not subject to attack (platinum, for example) in a single compartment is much more favorable to the manifestation of this effect: increase of electrolysis current, reduction of internal resistance, stability of the pH of the solution. In this case, it would be possible to follow the potential applied on the catalyst by means of a reference electrode.

The assembly, commonly called "three electrode assembly" is the one used in the experiments described further on.

Figure 2:
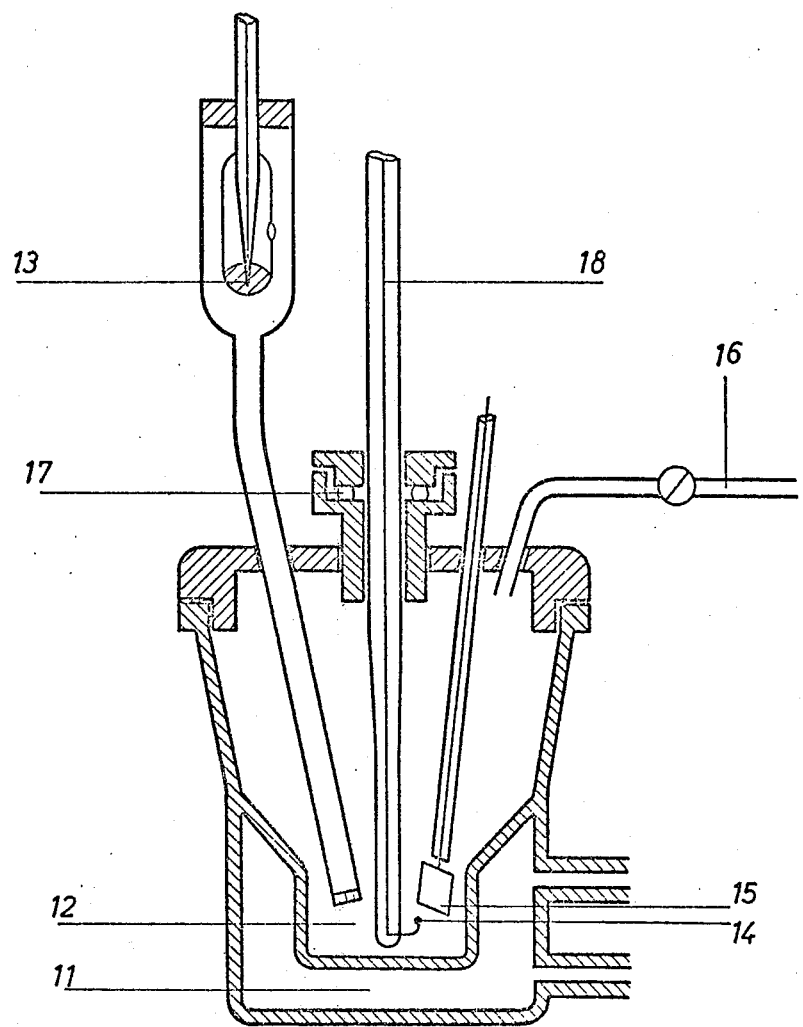

FIG. 2 shows a schematic section of a cell used in a three electrode assembly placed in a single compartment. Thermal equilibrium is ensured by circulation of a thermostatic liquid in a jacket 11 contiguous to the wall. Catalysis chamber 12 contains the reference electrode 13, the working electrode 14 and counter electrode 15. As before, the gases are evacuated via a tube 16, the cell is closed by a joint 17, e.g. made of Teflon, and electrode 14 is connected to a current generator by a copper wire 18.

The unexpected character of the effect of the polarizing on catalytic decomposition of hydrogen peroxide can be appreciated if we compare this effect to the increase in speed given by Faraday's law (release of oxygen of the platinum anode), as indicated in Table 2.

Table 2

| method of decomposition | specific rate |
|---|---|
| catalysis | 0.022 cm$^3$/s cm$^2$ |
| electrolysis* | 0.037 cm$^3$/s cm$^2$ |
| polarocatalysis* | 0.30 cm$^3$/s cm$^2$ |

*Potential 0.85 volts E.C.S., intensity 0.045 A
(E.C.S. = calomel electrode saturated with KCl)

This latter example shows well the increase of catalytic and electrolytic activity caused by polarization on the catalyst, and justifies the name "polarocatalytic effect" that is given to it. It is possible, with respect to this effect, to define on the one hand a Faraday yield, and on the other hand a coefficient of polarocatalysis. The latter is the ratio of decomposition at a specific voltage to the rate in absence of polarization (pure catalysis). This coefficient can reach high values, especially in a phosphate medium where the purely catalytic activity is extremely low as can be seen in Table 3.

Table 3

| applied potential | polarocatalytic coefficient |
|---|---|
| 0.25 volt/ECS | 1 |
| 0.50 volt/ECS | 2.5 |
| 2.25 | 19 |
| 3.75 | 26 |
| 7.25 | 34 |
| 9.75 | 40 | phosphate buffer pH 5.9
15.5% hydrogen peroxide

In the case of concentrated solutions of hydrogen peroxide, the polarocatalytic effect is also evident if a phosphate buffer is used, which is an inhibitor of catalytic decomposition. There is then obtained by polarization of the catalyst a partial restoration of the total of its purely catalytic activity in absence of phosphate, as the experiments indicated in Table 4 show.

Table 4

| potential volt/ECS | rate of decomposition solution A | rate of decomposition solution B | degree of restoration solution A | degree of restoration solution B |
| --- | --- | --- | --- | --- |
| 0 | 0 | 0 | 0 | 0 |
| 1 | 0.55 cm$^3$/s | 0.2 cm$^3$/s | 3% | 6% |
| 2 | 2.6 | 0.3 | 14% | 10% |
| 3 | 4.9 | 0.45 | 25% | 15% |
| 4 | 6.8 | 0.60 | 35% | 20% |
| 5 | 8.5 | 0.80 | 50% | 26% | solution A hydrogen peroxide 30% by weight
solution B hydrogen peroxide 98% by weight The degradation of hydrogen peroxide solutions by polarocatalysis offers a number of advantageous characteristics that can profitably be used in its applications. Thus, the functioning of the catalyst is not accompanied by a loss of material as is usually the case. On the other hand, the development of the rate of decomposition as a function of time may readily be eliminated by acting on the polarization of the catalyst. In particular, solutions with concentrations less than 30% can be decomposed more rapidly or more thoroughly by this process. Finally it has been observed that the lowering of activity of the catalyst in the course of its functioning could be avoided by polarizing it intermittently, the rest periods allowing spontaneous regeneration of the initial activity.

The polarocatalytic effect manifested by silver in the decomposition of hydrogen peroxide is found in certain other metals known for their catalytic properties in general. As a non limitative example, there may be mentioned platinum, for which high polarocatalytic coefficients have also been found, as indicated in Table 5.

Table 5

| applied voltage | specific rate of decomposition | electro- catalytic coeff. |
| --- | --- | --- |
| 0 | 0.004 cm$^3$/s cm$^2$ | 1 |
| 2.4 volts | 0.033 | 8.25 |
| 4.4 | 0.067 | 17 |
| 5.7 | 0.13 | 32.5 |
| 6.4 | 0.168 | 42 |

Hydrogen peroxide solution 30% by weight, buffered to pH 6.8, platinum electrode.

Generally speaking, the decomposition of hydrogen peroxide by polarocatalysis in the conditions described above is effected with a high Faraday yield (see for example Table 1). Consequently this process can be used with minimal expenditure of electric energy.

This process can be applied in various industrial uses of hydrogen peroxide, especially those that require its catalytic decomposition where it will allow an improvement of conditions of this decomposition, through control of the decomposition, higher yield, instantaneous rate that is higher, more rapid startup, hindering of wearing out of the catalyst.

Non limitative examples of embodiments of an oxygen generator with controlled output functioning according to the process of the invention are shown diagrammatically in FIGS. 3 and 4.

The decomposition reaction occurs in catalysis chamber 19, and the liberated oxygen is directed to a buffer chamber 20 before being directed toward the place of utilization.

A manometer 21 measures the pressure in the buffer chamber and controls the voltage control device 22, the voltage being supplied by a direct current generator 23.

The device for control of the speed of decomposition can be transistorized to get a very fast response time as indicated in FIG. 4. In this case the pressure sensing is ensured by a fast sensor 24 which sends a signal to the control device 25 of the voltage at the electrode terminals. The voltage increases when the pressure is lowered and vice versa, which makes it possible to impose on the generator a delivery of oxygen as a function of demand.

It is thus possible to develop monergol (fuel) engines or oxygen generators which are flexible in use. In the chemical or parachemical industry, application of this process could be imagined to adjust the titer of the hydrogen peroxide, or its pH, in a cell with separated compartments, for chemical operations, or to effect oxidations or electrochemical reductions at the level of the catalyst.

We claim:

1. In a process of heterogeneous catalysis of a chemical reaction comprising catalytic decomposition of aqueous solutions of hydrogen peroxide, the catalyst utilized being metallic and belonging to the class constituted by transition elements of groups I, VI, VII and VIII, the improvement comprising subjecting the said catalyst to a cathode or alternating voltage which has the effect of electrochemically polarizing it and increasing the catalytic reaction at said catalyst cathode, the nature of the catalyst and the level of the applied voltage being such as to effect release of oxygen primarily at the catalyst cathode.

2. Process as in claim 1, characterized in that the said catalyst is metallic silver or a silver compound.

3. Process as in claim 1, characterized in that the said catalyst is a triad element, or a compound of the said element.

4. Process as in claim 1, characterized in that the said catalyst is platinum, or a platinum compound, or a platinum metal compound.

5. A process as claimed in claim 1 wherein there is added to the solution of hydrogen peroxide a salt or a compound which ensures a high electroconductivity of the said solution.

6. Process as in claim 1, characterized in that there is added to the hydrogen peroxide solution a salt or a compound that fixes the pH of the said solution.

7. Process as in claim 1, characterized in that there is added to the said solution a compound that inhibits the decomposition of hydrogen peroxide.

8. Process as in claim 7, characterized in that the said inhibitor compound is a phosphate.

9. Process as in claim 1, characterized in that preliminarily to the catalytic decomposition, there is a cathodic polarizing of the catalyst.

* * * * *